June 4, 1957
A. T. DILDILIAN ET AL
2,794,237
METHOD OF PRODUCING FIBER GLASS MATS
Filed Jan. 29, 1954
2 Sheets-Sheet 2
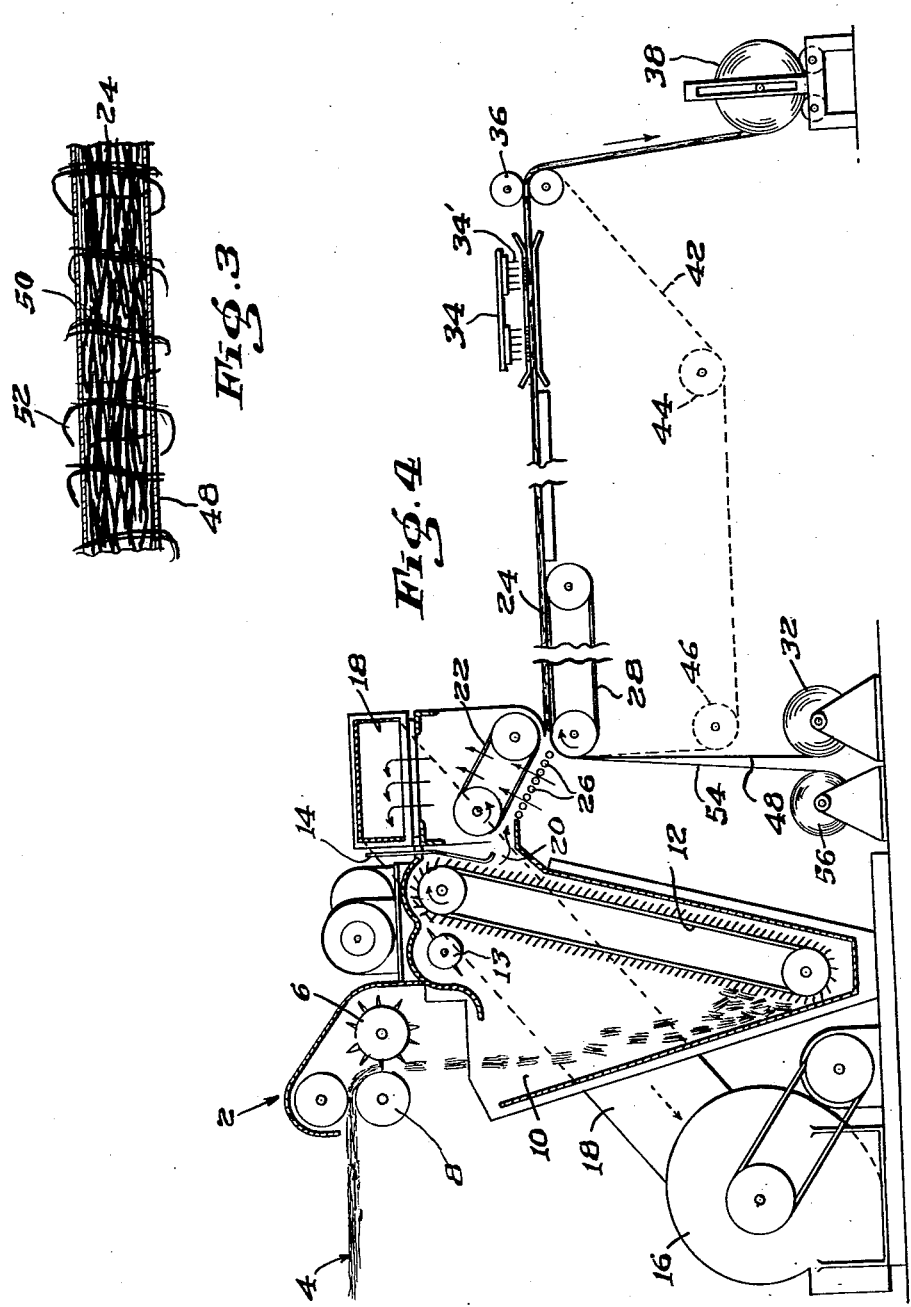
INVENTORS
ARA T. DILDILIAN
KENNETH M. WOOD
BY
ATTORNEY United States Patent Office 2,794,237
Patented June 4, 1957

2,794,237

METHOD OF PRODUCING FIBER GLASS MATS

Ara T. Dildilian, Suffield, and Kenneth M. Wood, Hazardville, Conn., assignors, by mesne assignments, to Fiber Glass Industries, Inc., Amsterdam, N. Y., a corporation of New York Application January 29, 1954, Serial No. 406,951

7 Claims. (Cl. 28—72.2)

This invention relates to the manufacture of fiber glass mats providing a low density sheet of glass fibrous material consisting essentially of short strands of glass fibers in cut strand or staple form. The invention finds its principal use in the provision of re-enforcing materials for molded plastic structures, though the products thereof are useful in various other applications with or without being incorporated in plastic media.

Heretofore unwoven glass fiber mats have been made wholly of individual, separate fibers or have included therein only minor amounts of short lengths of textile glass fibers collected in the form of cut strands comprising a large number of fine filaments bundled together in the manufacture of the strands and held in strand form by the incorporation of an adhesive size finish. This finish, particularly if the resultant product is to be incorporated in a plastic, is both for the purpose of securing together the individual fibers in strand form and to provide a non-polar fiber surface for better bonding of the strands with plastic materials. The cut strands or staples thus referred to for incorporation in mats have been chopped up into short lengths ranging from ½ inch up to 3 inches or thereabouts. For purposes of maximum efficiency in reinforcing, it is desirable to have as high a proportion of the glass fibers in such strand form as is possible. Heretofore, contrary to the present invention, it long has been thought necessary, in order to impart sufficient integrity to the product, to provide some additional means of sufficiently holding together the chopped glass fiber strand portions so as to give the mat at least strength for handling purposes. This was usually provided by fibrilation of many of the strands by means of which a very substantial quantity of individual, separate fibers are haphazardly arranged in the product. The short strands were further joined together by an added adhesive binder. Either or both of these practices is undesirable and we have discovered that neither is necessary in the provision of the much improved and novel mat provided by this invention. The fine fibers are undesirable because much greater reinforcing strength (particularly for plastics) is obtained when the fibers are present in strand form rather than random, individual filament form. The incorporation of an adhesive bonding agent is undesirable because if this binder is thermoplastic in nature and of the type which will dissolve in the reinforcing plastic molding material (as is usually the case), the mat will, during the initial stages of the molding operation lose its integrity and break into segments (commonly known as "washing") under the force of the impregnating fluid molding material.

If a non-thermoplastic bonding agent is used, the resultant mat will produce an inferior product since bonding agents of this type provide a poorer surface for adhesion with the plastic than the glass fiber containing only the original finish size would have formed. Such a non-thermoplastic sizing will interfere with the thorough saturation and the wetting of the individual fibers of the mat.

As above indicated, by the present invention we have been able to eliminate these undesirable and expensive expedients, both of which are currently employed in order to provide a glass mat product having the coherence and handling characteristics necessary for use as reinforcement in present-day molded plastic articles. Our process provides a product mainly or indeed preferably substantially wholly of chopped up glass fibrous multi-filament strands mechanically interlocked by the glass strands themselves so as to give the desired necessary mechanical strength for commercial purposes.

We may, for some purposes, incorporate a reinforcing facing, in the form of a glass surfacing web, on one or both faces of the mat.

In the accompanying drawings which illustrate the invention:

Fig. 1 is a photomicrograph of a section of one product of the process of this invention having no surfacing web;

Fig. 2 is a photomicrograph of a section of another product of the process of the invention having one surfacing web;

Fig. 3 is an enlarged schematic view of a portion of still another product of the process of the invention but including two surfacing webs; and Fig. 4 illustrates, somewhat diagrammatically, the process of the invention and apparatus by which it may be carried out.

Referring to Fig. 4 of the drawings, there is fed to the strand chopping device 2 a rope of some hundreds of strands, each composed of many individual adhesively joined glass filaments. The strands are chopped into short lengths by the rotary cutter 6 as they pass over the underlying firm rubber roll 8. Several choppers may be employed if it is desired to have different lengths in the mat, for example, a range of lengths between ½ and 3 inches, or strands may be separately cut to different lengths. Preferably, however, the blades of the rotary cutter 6 are spaced unequally around the periphery of the cutter so that the pieces cut off by it are of different lengths.

The cut, short, or staple lengths are discharged into the hopper of the feeder 10, which may be of the well known Bramwell type, as shown, including a spiked apron 12 and stripper roll 13. The apron carries the cut strands over the top thereof and downwardly between the lower flight of the apron and a louver wall 14. An exhaust fan 16 draws a stream of air into the air conduit 18 from the directions indicated by the arrows. The cut lengths of glass fiber bundles are aided materially in passing from the spikes of the lower flight of apron 12 by the downwardly flowing air stream, indicated by the arrow 20, so that the cut strands are stripped clear of the spikes near the bottom of the louver 14, and then carried laterally by the air stream into the wedge-shaped opening at the upper end of the lower, downwardly moving flight of the foraminous screen belt 22. Air is drawn upwardly through the belt 22, against which the cut strands lodge and are formed into a uniform bat 24, being held against the belt by the air passing upwardly between the rollers 26 underlying the belt, through the bat, and through the belt 22 itself. The cut, staple-length bundles of fibers as so deposited lie primarily parallel to the faces of the bat, although they extend in random directions in any given plane parallel to the face of the bat. The bat 24 thus formed is carried downwardly by the screen belt 22 until it passes from that belt to a carrier supported and carried along by belt 28 underlying it.

At this point the operation may be varied somewhat, depending upon whether a glass surfacing web (or webs) are to be applied to the bat. For some purposes a more suitable product is obtained by the use of a surfacing web comprising a layer of glass fibers adhesively bonded into a coherent, self-sustaining web which is thin as compared with the main body of the bat. If one such surfacing web 48 is to be applied, it is drawn from a roll 32 and is fed to underlie the screen belt 22 and so as to be positioned between the belt 28 and the overlying bat of glass strands 24. The bat is then carried along with the surfacing web 48 through a conventional needling device 34, being intermittently drawn therethrough by a roll pair 36, the lower roll of which, preferably of rubber, is intermittently driven in step with the vertical reciprocations of the conventional vertically reciprocating needling device 34. The needling device by means of its barbed needles 34' draws some of the strands or portions thereof as at 52, Fig. 3, down through the bat of cut strands and into or through the lower underlying web 48. From the rolls 36, the mat, with its attached surfacing material passes downwardly to be rolled as finished fabric into the roll 38 as shown.

If a glass surfacing web is to be applied to both sides of the bat, the mat is reversed and run through the machine a second time, thus applying the surfacing web 50 (Fig. 3).

In the same way we may incorporate into the product a woven or unwoven (felted) sheet or layer. This sheet or layer may be an open mesh fabric such as scrim or may be a closely-woven fabric. It may comprise cotton, wool, rayon, or other textile material.

If neither glass surfacing web is desired, a belt 42 of burlap or the like, may be supplied to serve as a temporary carrier for bat 24, passing about the two lower rolls 44 and 46, then upwardly over the belt 28 and through the needling machine, being separated from the needled mat as it leaves the lower of the pressure rolls 36 to return about the two lower rolls 44, 46, the mat being wound up at 38, as before, as a finished fabric.

In any case, the cut strands are mechanically associated in the form of a mat, with the individual cut lengths thereof randomly oriented in the plane of the mat, although lying generally in or parallel to this plane, so that the ultimate product normally exhibits strands lying in all directions in the plane thereof. These cut strands, surprisingly, largely retain their initial form as discrete bundles of filaments notwithstanding the mat has undergone the described needling operation to such an extent as to cause such displacement and intertangling of fibers as to cause the completed mat to be coherent and self-sustaining when handled. Also, by means of the needling of the bat, sufficient stability is imparted to the bundles, or strands, thus bound together to form a product of sufficient integrity and strength to be useful for plastic moulding and some other purposes, even without a surfacing web or webs. If a relatively smooth and continuous surface is necessary for the particular use, however, then a surfacing web may be supplied to one or both sides of the bat as may be required.

Heretofore the manufacture of glass fiber mats of a thickness such that their weight exceeded 3 oz. per square foot, including a binding material, has not been commercially practicable. In actual practice, by means of this invention, glass mats have been made substantially in excess of that thickness which are entirely suitable for most plastic moulding operations, and this without the inclusion of a binding material. Furthermore, the manufacture of satisfactory mats of even greater thickness is possible by means of our invention, this being accomplished by feeding multiple plies of bat to the flared entrance of the needling device which are then united by the needling operation to thereby form an integral product.

In the manufacture of plastic molded products it is often desirable to have much greater strength uni-directionally than can be obtained by present practices. By means of our invention it is possible to incorporate in the product a greater density of glass uni-directionally so as to achieve this end. For the purpose of imparting this additional strength longitudinally or transversely, or both, without increasing the bulk of the product materially, a minor amount of individual glass fiber strands of long length may be incorporated in the mat, for example, by having a series of said strands 54 wound on a spool or beam 56 which is then suitably mounted so that the strands may be fed to the bat before it is needled. Where a surfacing web is employed, the strands may be fed to the bat at the point where the surfacing web and the bat of fibers are brought together, preferably inserting these individual strands so that they will extend longitudinally in the fabric substantially between the surfacing web and the fibrous bat. Where separate bats may be formed and then united, as disclosed above, these uni-directional filaments or strands would preferably be inserted between two bats. If additional tensile strength transversely is desired these filaments or strands may be incorporated in a light-weight sheet by any well known means, as, for example, by affixing them longitudinally to a light-weight surfacing web such as is employed in our invention. This surfacing web with the strands attached thereto is then cut into strips corresponding to the width of the mat being produced and successive strips fed to the top or bottom surface of the bat so that the strands attached to the surfacing web will extend transversely of the mat, or such strips could be inserted between bats.

The present application is a continuation-in-part of our prior application Serial No. 324,988 filed December 9, 1953.

We claim:

1. The method of making a fiber glass mat providing a low density sheet of glass fibrous material having sufficient coherence and integrity to be self-sustaining when handled, and consisting essentially of short strands each including a multiplicity of fibers, said method comprising cutting short, staple, lengths from a plurality of continuous strands, each strand comprising a multiplicity of adhesively joined glass filaments, supporting said cut lengths in a stream of air and depositing them from the air stream to form a bat wherein most of the cut lengths are disposed parallel to the plane of the bat, and needling the bat to cause portions of some of said cut lengths to be displaced into positions transverse to the plane of the bat and thereby mechanically maintain the cut lengths in sheet form, without separating any substantial proportion of the strands into their component filaments.

2. The method of making a fiber glass mat providing a low density sheet of glass fibrous material having sufficient coherence and integrity to be self-sustaining when handled, and consisting essentially of short strands each including a multiplicity of fibers, said method comprising cutting short, staple, lengths from a continuous strand comprising a multiplicity of adhesively joined glass filaments, supporting said cut lengths in a stream of air and depositing them from the air stream to form a bat wherein most of the cut lengths are disposed parallel to the plane of the bat, placing said bat in face-to-face contact with a thin self-sustaining web of adhesively-bonded glass fibers, and needling the bat and web to cause portions of some of said cut lengths to be displaced into positions transverse to the plane of the bat and web and thereby mechanically maintain the cut lengths in sheet form united with said web, without separating any substantial proportion of the strands into their component filaments.

3. The method of making a fiber glass mat providing a low density sheet of glass fibrous material having sufficient coherence and integrity to be self-sustaining when handled, and consisting essentially of short strands each including a multiplicity of fibers, said method comprising cutting short, staple, lengths from a continuous strand comprising a multiplicity of adhesively joined glass filaments, supporting said cut lengths in a stream of air and depositing them from the air stream to form a bat wherein most of the cut lengths are disposed parallel to the plane of the bat, placing in contact with said bat a minor amount of long-length strands comprising a multiplicity of united glass filaments, and needling the bat and long-length strands to cause portions of some of the cut lengths to be displaced into positions transverse to the plane of the bat, without separating any substantial proportion of the strands into their component filaments, and thereby mechanically maintain the cut lengths and long-length strands in sheet form.

4. The method of claim 3 wherein said long-length strands are disposed lengthwise of the mat.

5. The method of claim 3 wherein said long-length strands are disposed widthwise of the mat.

6. The method of making a fiber glass mat providing a low density sheet of glass fibrous material having sufficient coherence and integrity to be self-sustaining when handled, and consisting essentially of short strands each including a multiplicity of fibers, said method comprising cutting short, staple-length pieces of differing lengths from a plurality of continuous strands, each strand comprising a multiplicity of adhesively joined glass filaments, supporting said cut lengths in a stream of air and depositing them from the air stream to form a bat wherein most of the cut lengths are disposed parallel to the plane of the bat, and needling the bat to cause portions of some of said cut lengths to be displaced into positions transverse to the plane of the bat and thereby mechanically maintain the cut lengths in sheet form, without separating any substantial proportion of the strands into their component filaments.

7. The method of making a fiber glass mat providing a low density sheet of glass fibrous material having sufficient coherence and integrity to be self-sustaining when handled, and consisting essentially of short strands each including a multiplicity of fibers, said method comprising cutting short, staple lengths from a continuous strand comprising a multiplicity of adhesively joined glass filaments, supporting said cut lengths in a stream of air and depositing them from the air stream to form a bat wherein most of the cut lengths are disposed parallel to the plane of the bat, placing said bat in face-to-face contact with a thin self-sustaining web of adhesively bound glass fibers, and needling the bat and web to cause portions of some of said cut lengths to be displaced into positions transverse to the plane of the bat and extending through said web, thereby mechanically maintaining the cut lengths in sheet form united with said web, without separating any substantial proportion of the strands into their component filaments.

References Cited in the file of this patent

UNITED STATES PATENTS

| | | |
|---|---|---|
| 2,158,533 | Cavey | May 16, 1939 |
| 2,339,431 | Slayter | Jan. 18, 1944 |
| 2,477,555 | Roberts et al. | July 26, 1949 |
| 2,528,091 | Slayter | Oct. 31, 1950 |
| 2,584,702 | Hogendobler | Feb. 5, 1952 |
| 2,639,759 | Simison | May 26, 1953 |